(12) United States Patent
Allos et al.

(10) Patent No.: US 10,266,194 B2
(45) Date of Patent: *Apr. 23, 2019

(54) SPECIALTY DOLLY

(71) Applicant: Khalid Mike Allos, Lakeside, CA (US)

(72) Inventors: Khalid Mike Allos, Lakeside, CA (US);
Layth Karana, Lakeside, CA (US);
Zayed Zawaideh, Lakeside, CA (US)

(73) Assignee: Khalid Mike Allos, Lakeside, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/161,961

(22) Filed: May 23, 2016

(65) Prior Publication Data

US 2016/0297457 A1  Oct. 13, 2016

Related U.S. Application Data

(63) Continuation of application No. 14/539,233, filed on Nov. 12, 2014, now Pat. No. 9,358,995.

(Continued)

(51) Int. Cl.
*B62B 5/00* (2006.01)
*B62B 3/00* (2006.01)
*B62B 3/02* (2006.01)
*B60B 30/02* (2006.01)

(Continued)

(52) U.S. Cl.
CPC .............. *B62B 3/008* (2013.01); *B60B 30/02* (2013.01); *B60B 30/10* (2013.01); *B60B 33/0028* (2013.01); *B60B 33/0042* (2013.01); *B62B 3/002* (2013.01); *B62B 3/02* (2013.01); *B62B 5/0026* (2013.01); *B62B 5/0033* (2013.01);

(Continued)

(58) Field of Classification Search
CPC ........... B62B 3/00; B62B 3/002; B62B 3/007; B62B 3/008; B62B 3/02; B62B 3/10; B62B 5/0026; B62B 5/0093; B62B 2202/90; B62B 2202/48; B62B 2202/10; B62B 2202/62; B60B 33/0042
See application file for complete search history.

(56) References Cited

U.S. PATENT DOCUMENTS 637,650 A   11/1899 Northrop
2,226,521 A  12/1940 McNamara
(Continued)

FOREIGN PATENT DOCUMENTS

DE        2426549 A1   12/1974

*Primary Examiner* — Emma K Frick
(74) *Attorney, Agent, or Firm* — Mayer & Williams PC (57) ABSTRACT

A specialized dolly is provided that works with a hydraulic floor jack; together the assembly performs the lifting and moving of vehicles with ease and efficiency. The configuration and design of the dolly enables a standard hydraulic floor jack to be positioned within a frame of the dolly in a stationary position. A handle of a hydraulic floor jack can then be used to maneuver the combination dolly/floor jack assembly with ease on the floor of the repair shop. The dolly may be designed and configured to have stationary low resistance front rear wheel assemblies, both of which provide for convenient maneuvering and steering. The dolly's wheel tracks (distance between front wheels) and its wheelbase length (distance between front and rear wheels) allows the dolly to be stable and significantly maneuverable, especially over or around potholes, slopes, and ramps, and also provides greater safety for the operating technician.

23 Claims, 7 Drawing Sheets

Related U.S. Application Data (60) Provisional application No. 61/920,453, filed on Dec. 23, 2013.

(51) Int. Cl.
    *B60B 30/10* (2006.01)
    *B60B 33/00* (2006.01)
    *B25H 5/00* (2006.01)

(52) U.S. Cl.
    CPC .............. *B62B 5/0093* (2013.01); *B25H 5/00* (2013.01); *B62B 2202/10* (2013.01); *B62B 2202/48* (2013.01); *B62B 2202/90* (2013.01); *B62B 2203/10* (2013.01); *Y02T 10/86* (2013.01); *Y10T 29/49826* (2015.01)

(56) References Cited

U.S. PATENT DOCUMENTS

| | | |
|---|---|---|
| 3,294,417 A | 12/1966 | March |
| 3,650,342 A | 3/1972 | Pushnig et al. |
| 4,127,202 A | 11/1978 | Jennings et al. |
| 5,452,909 A | 9/1995 | Zinski |
| 5,947,447 A | 9/1999 | Sorensen |
| 5,957,482 A | 9/1999 | Shorter |
| 6,109,625 A | 8/2000 | Hewitt |
| 6,179,542 B1 | 1/2001 | Haven |
| 6,502,656 B2 | 1/2003 | Weiss et al. |
| 6,824,160 B2 | 11/2004 | Goldie |
| 6,966,573 B2 | 11/2005 | Goldie |
| 7,163,214 B1 | 1/2007 | Bratton, Sr. |
| 7,281,720 B1 | 10/2007 | Richards |
| 7,543,830 B2 | 6/2009 | Symiczek |
| 8,172,255 B1 | 5/2012 | Martin |
| 8,246,059 B2 | 8/2012 | Gass et al. |
| 8,302,934 B1 | 11/2012 | Woods |
| 8,439,375 B2 | 5/2013 | Martinez |
| 8,740,228 B2 | 6/2014 | Patterson et al. |
| 8,777,544 B1 | 7/2014 | Carpenter |
| 8,882,115 B1 | 11/2014 | Roy |
| 2007/0102599 A1 | 5/2007 | Lin |
| 2007/0170676 A1 | 7/2007 | Hilditch |
| 2009/0315285 A1 | 12/2009 | Glass |
| 2013/0266415 A1 | 10/2013 | Czartoryski et al. |
| 2015/0091260 A1 | 4/2015 | Ingham et al. |

SPECIALTY DOLLY

CROSS-REFERENCE TO RELATED APPLICATIONS

This application is a continuation of U.S. Ser. No. 14/539,233, filed Nov. 12, 2014, entitled "Specialty Dolly", now U.S. Pat. No. 9,358,995 issued Jun. 7, 2016 which claims benefit of priority of U.S. Provisional Patent Application 61/920,453, filed Dec. 23, 2013, entitled "Specialty Dolly for Automotive Repair", which is incorporated by reference herein in its entirety.

FIELD

The invention relates to the floor jacks, and in particular to movable floor jacks.

BACKGROUND

It is very common for vehicle repair shops and collision centers to have disabled vehicles in their lots. These vehicles are usually involved in a collision with other vehicles or objects and such have often sustained damage to their tires, wheels and/or suspension component/s. Such damage renders the vehicle inoperable and immovable in a conventional way.

Moreover, recent vehicle models, especially electric or hybrid vehicles, can have an electrical malfunction that can also render a vehicle inoperable, and the popularity of such vehicles makes such situations increasingly common in automotive repair shops. In such cases, automotive repair shops are without options for moving the vehicle for short distances. Tow trucks are usually used to move disabled vehicles and that is commonly how such vehicles are delivered to the repair shop. However, within the parking lot of a repair shop, a tow truck is not practical for moving disabled vehicles. In fact, many repair shops do not have their own tow truck, and even if they do, it is not practical to use them for short distance transportation within a parking lot and repair shop bays. Due to the lack of options, the automotive technician is forced to resort to hydraulic floor jacks to move these vehicles, although hydraulic floor jacks are designed for lifting vehicles, but not moving them. In this use, the technician places the hydraulic floor jack underneath the damaged area of the vehicle. The technician lifts the damaged section of the car off the ground and uses the hydraulic floor jack wheels and casters to roll the vehicle to a desired location. However, this technique has significant deficiencies that can reduce the productivity of the technician and the entire repair shop, and can also increase the expense of the repair shop. The fact that the hydraulic floor jack is designed for lifting vehicles, and not moving them, creates challenges, problems and deficiencies for the technician and the overall repair shop operation.

In particular, one deficiency is that automotive hydraulic floor jacks are designed to operate on vehicles that are in a stationary mode. In particular, the same are designed for the purpose of repairing or servicing a vehicle's undercarriage, and are not designed nor are they suitable for rolling around the repair shop floor, especially when supporting the weight of a vehicle.

Another deficiency is that hydraulic floor jacks are not designed and are not suitable for maneuvering over or around small potholes, slopes and ramps. The use of the hydraulic floor jack to move disabled vehicles over or around potholes, slopes and ramps can significantly compromise the safety of the technician and the vehicle being moved.

A further deficiency is that the inefficient activity of moving disabled and heavy vehicles using hydraulic floor jacks causes fatigue for the technician which can result in lower productivity and possible injury. This activity is inherently slow moving, sluggish, and challenging to perform, and is a difficult way to maneuver a vehicle.

Yet another deficiency is that the prolonged utilization of the hydraulic floor jack to move disabled vehicles can inflict a great deal of structural stress and damage to the hydraulic floor jack's mechanical components, such as the wheels and casters. As a result, these hydraulic floor jacks are forced to have premature functionality failures, downgraded performance, and considerably shorter life expectancies. Such premature failures significantly impact the life expectancy of a valuable automotive repair shop tool, especially since hydraulic floor jack components are not serviceable and replacement parts are not available.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The combination dolly/floor jack assembly can be designed as a strictly mechanical system that may be operated by one technician towing and guiding the same with the help of two or three other optional technicians that help to push the vehicle around the shop floor or parking lot and over or around potholes, slopes, and ramps.

Alternatively, the combination dolly/floor jack assembly can also be configured as an electromechanical system that may include electrically motorized front and/or rear wheels. The electromechanical dolly may use an internal or external power source to provide locomotion to the dolly. The electrical components may be integrated inside the dolly's main frame and body and may be configured to not interfere with the workspace of the floor jack and its functionality. The motor controls may be multi functional and may power the dolly to operate in both forward and reverse directions. The electrical component may provide modulated and variable power to the wheels, e.g., the right and left front wheels. The electromechanical dolly may further allow for just one technician to mobilize the vehicle and therefore provide a significant savings in labor.

In one aspect the invention is directed towards a specialty dolly for automotive repair, including: a housing including a base having a top side and a bottom side, a portion of the top side defining a horizontal surface, the base substantially surrounded on its perimeter by a plurality of side portions, the side portions and the base defining a recessed portion configured for receiving a floor jack atop the top side; and at least three wheel assemblies, the wheel assemblies configured to support the housing such that the housing is elevated above a support surface for movement, and such that at least one wheel assembly is rotatable about an axis perpendicular to the horizontal surface, and such that at least one wheel assembly is fixed relative to the axis; such that the bottom surface includes an angled section, whereby the housing and wheel assemblies can maneuver over and or around bumps, potholes, slopes or ramps.

Implementations of the invention may include one or more of the following. The plurality of side portions number may four in total, and may further include at least additional one wheel assembly, such that the housing is configured to be supported by a total of four wheel assemblies on the support surface, the four wheel assemblies disposed in a rectangular configuration, such that at least two wheel assemblies are adjacent and rotatable about the axis perpendicular to the horizontal surface, and such that at least two other wheel assemblies are adjacent and fixed relative to the axis perpendicular to the horizontal surface. The angled section may run between the two wheel assemblies that are fixed and the two wheel assemblies that are rotatable. The angled section may form an inverted V shape, and a peak of the V shape may be between the two wheel assemblies that are rotatable and the two wheel assemblies that are fixed. The angled section may form an angle of between about 172° and 179°, such as between about 176 and 178°, such as, e.g., 177°. In use on a support surface, a height of a topmost portion of the dolly may be less than about 6 inches. Each of the two wheel assemblies that are rotatable may include a wheel bearing such as an angular contact thrust ball bearing, such that each wheel assembly has significant strength along the axis and significant strength in a direction transverse to the axis.

Each of the two wheel assemblies that are rotatable may have an offset of between about 1.35 and 1.50 inches. Each of the wheel assemblies may further include a dual wheel assembly, where each wheel of the dual wheel assembly is independently rotatable. In this case each wheel may have a radius of between about 2 and 3 inches and a width of between about 1 and 2 inches. Each wheel may be made from polyurethane. Each wheel may be made from a material having a hardness of between about 90 and 100 durometer, e.g., about 95 durometer. Each dual wheel assembly may define a space between the wheels, and each respective angular contact thrust ball bearing may be disposed within the space. In use on a support surface, the dolly may be moved and maneuvered using a handle of a floor jack. The housing may further include a source of locomotion by which the dolly may be powered for movement, such as a rubber track system or a drive system for one or more of the wheel assemblies. The housing may further include a means for lifting coupled to the top side, which itself may be a jack system or which may operate the hydraulic jack system. In use on a support surface, a majority of carried weight is supported by the set of rotatable wheel assemblies or by the set of fixed wheel assemblies.

At least one of the side portions may be configured to be removable, such as running within slats, such that upon removal, the floor jack may be rolled onto and off of the top side.

In another aspect, the invention is directed towards a method of making a dolly for automotive repair, including: providing a base having a top side and a bottom side; mounting side portions to the base, such that the top side of the base has a portion configured to receive a floor jack; and mounting wheel assemblies to the side portions, such that two wheel assemblies are configured to be rotatable and two wheel assemblies are configured to be fixed.

In one implementation, each wheel assembly includes dual wheels.

Advantages of the invention may include, in certain embodiments, one or more of the following. The dolly according to present principles provides a convenient way to move disabled vehicles. The same works with current components such as floor jacks, and can provide significantly greater functionality thereto. Other advantages will be understood from the description that follows, including the figures and claims.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Figure 1:
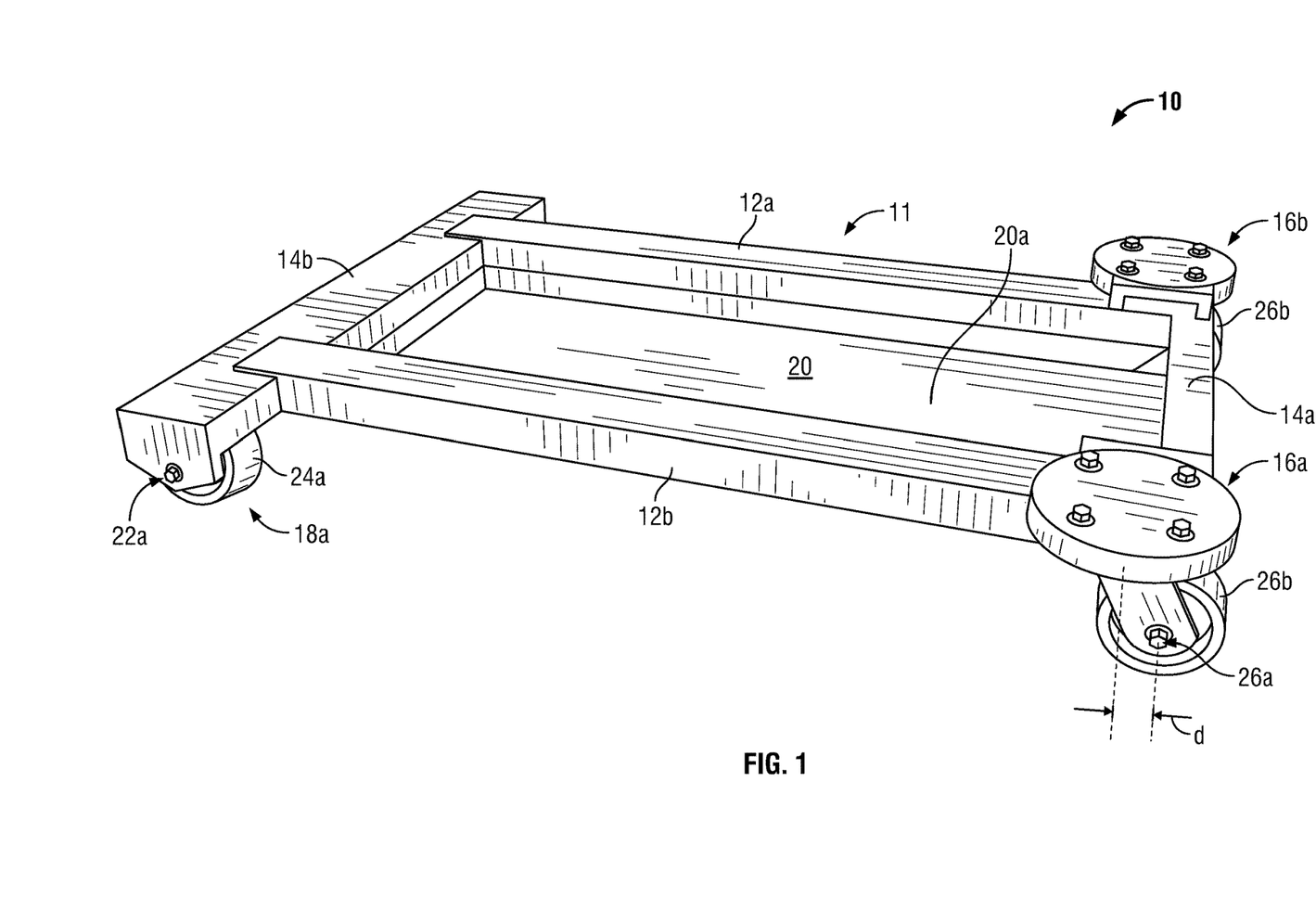
FIG. 1 illustrates a perspective view of a dolly according to present principles.
Figure 2:
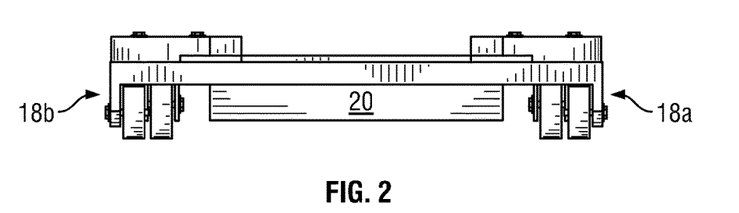
FIGS. 2-7 illustrates various views of the dolly of FIG. 1.
Figure 3:
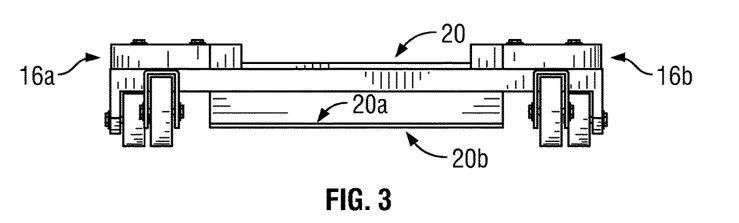

Referring to FIG. 1, the dolly 10 may generally include a housing 11 having a base 20 with a top side 20a and a bottom side 20b. A portion of the top side 20a is generally horizontal so as to allow the placement thereon of a floor jack. One or more side portions 14a, 14b, 12a, and 12b generally surround the perimeter of the base. The combination of the base and side portions (which together forms the housing 11) generally has a recessed shape configured to receive and secure a floor jack. In other words, due to the recessed shape, once a floor jack is placed on the base, it is generally secured, at least within the confines of the side portions. The floor jack may move on the base until the same abuts the side portions, or wood pieces or other separators may be used to secure the floor jack on the base. It is also to be understood that floor jacks often have a common footprint, and that the base 20 may be sized so as to be consistent with this common footprint.

The dolly also has at least three wheel assemblies, and commonly four, the same shown in FIG. 1 as wheel assemblies 16a, 16b, 18a, and 18b. The wheel assemblies 18a and 18b include wheels 24a and 24b, respectively, while the wheel assemblies 16a and 16b include wheels 26a and 26b, respectively. Some of the wheel assemblies, such as wheel assemblies 16a and 16b, may be rotatable, while others, such as the wheel assemblies 18a and 18b, may be fixed or non-rotatable. The wheel assemblies, if rotatable, are generally rotatable about an axis perpendicular to the horizontal surface, while the wheel assemblies 18a and 18b are fixed with respect to this same axis. FIGS. 2-7 illustrate other views of the dolly.

In a particular implementation, the dolly is generally rectangular in shape, the side portions number four in total, side portions 12a and 12b are generally parallel, side portions 14a and 14b are also generally parallel, and four wheel assemblies are provided, two of which are rotatable and two of which are fixed.

Figure 4:
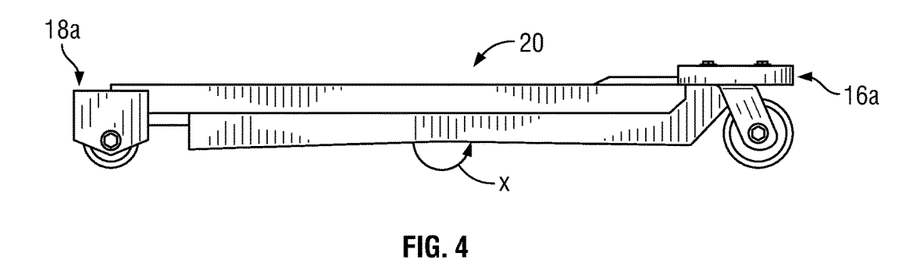
Figure 5:
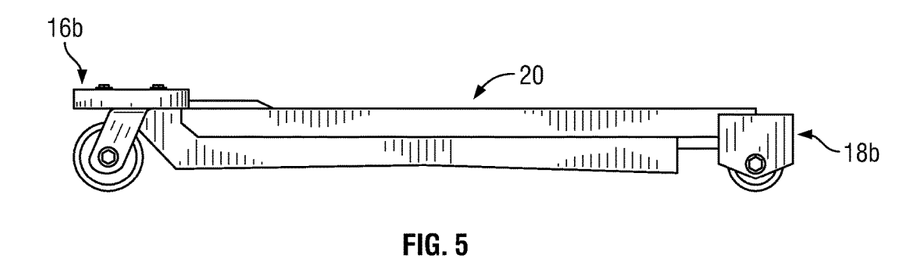
Figure 6:
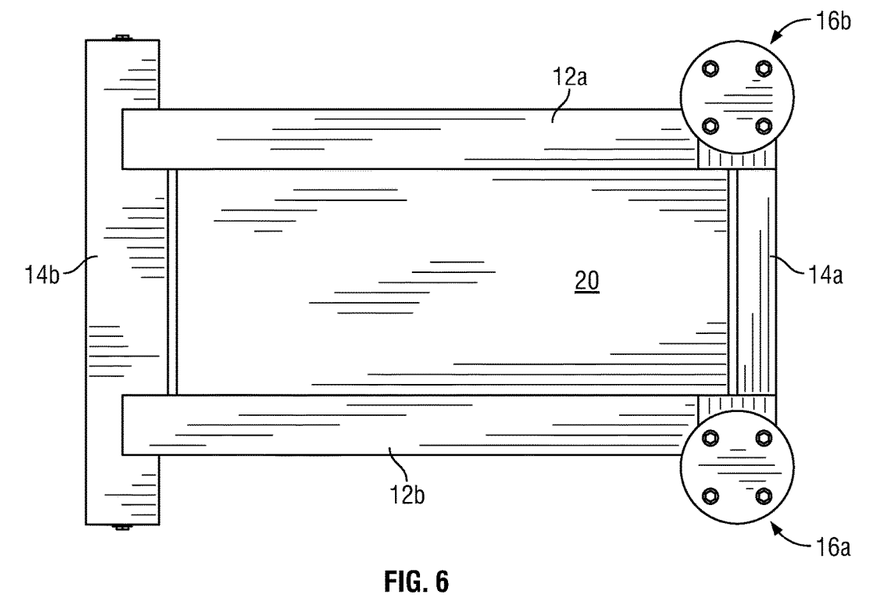
Figure 7:
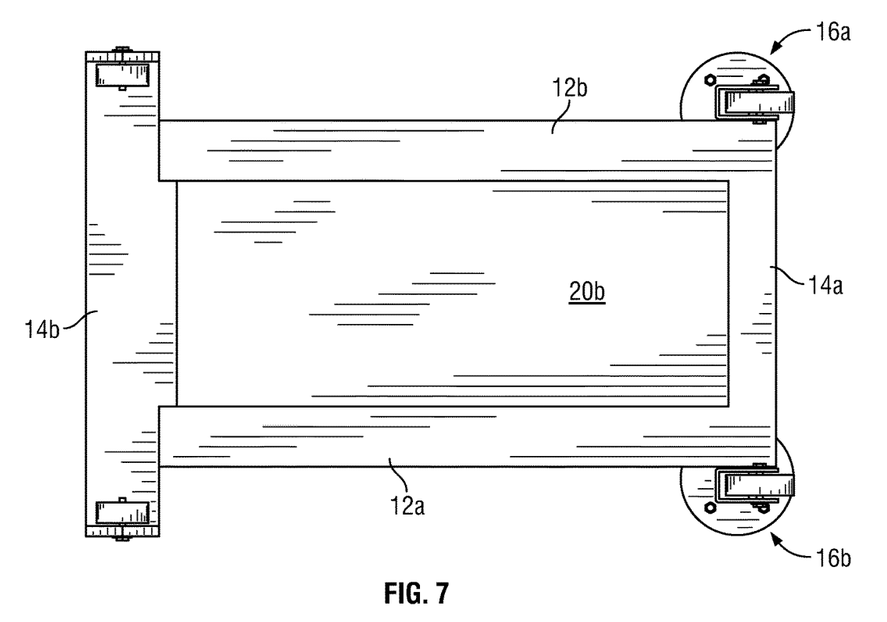

The dolly's wheel tracks (distance between front wheels, approximately the same as the length of portion 14a) and the length of the wheel base (distance between front and rear wheels, approximately the same as the length of portion 12a or 12b) significantly increases stability and maneuverability. A slope, slant, angle, or other such cantor may be defined on the bottom side 20b and/or on the portions 12a and 12b, the angle having an inverted V shape and indicated by x as shown in FIG. 4, and measuring, e.g., between about 172 and 179°, or between about 176 and 178 degrees, e.g., about 177 degrees. This feature enhances the ability of the dolly to negotiate obstacles such as potholes. Generally, but not always, the angle runs between the two wheel assemblies that are fixed and the two that are rotatable.

In some cases the angled section is higher relative to the support surface (i.e., the surface on which the dolly is placed) at a location proximal the two wheel assemblies that are rotatable and lower relative to the support surface at a location proximal the two wheel assemblies that are fixed, further increasing the ability of the dolly to negotiate obstacles such as potholes.

Figure 8:
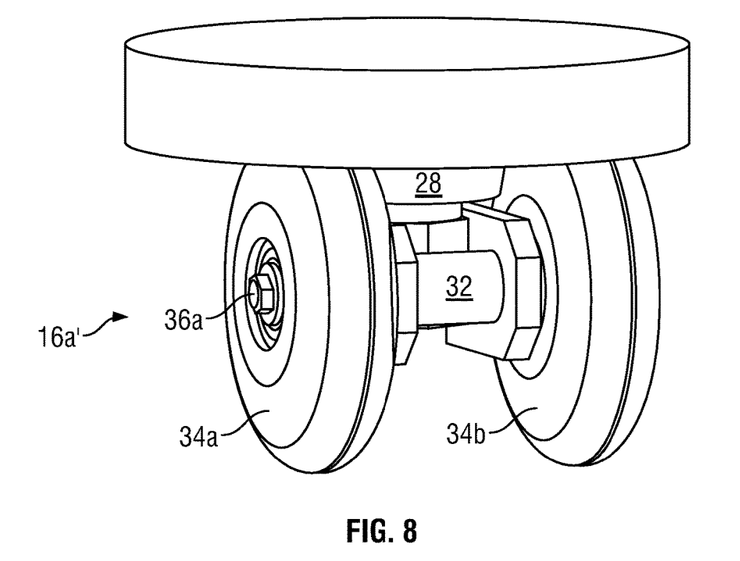
FIG. 8 illustrates a wheel assembly that may be employed in the dolly of FIG. 1.

Other details are now described. In use on a support surface, a height of a topmost portion of the base may be less than about 6 inches. The rotatable wheel assemblies may each include an angular contact thrust ball bearing, such that each wheel assembly has significant strength along the axis and significant strength in a direction transverse to the axis. Such an angular contact thrust ball bearing is illustrated in FIG. 8 as bearing 28, which also shows a dual wheel assembly 16a', in which two wheels 34a and 34b, which can be independently rotatable, are on opposite sides of the angular contact thrust ball bearing 28. In some implementations, such dual wheel assemblies are used for at least one and in some cases all wheel assemblies. The angular contact thrust ball bearing 28 is perpendicular to an axle 32, which along with attachment devices 36a hold the wheels on the wheel assembly.

The base and side portions may be made from, e.g., steel, aluminum, and the same may also form other structural components of the dolly. The wheels may be made from various polymer composites, including polyurethane, and in many cases are between 1 inch and 2 inches wide, and between 2 inches and 3 inches in radius. The wheels may have a hardness of between about 90 and 100 durometer, e.g., 95 durometer. As noted, dual wheel assemblies may be employed, where the dual wheel assemblies have a space therebetween, and an angular contact thrust ball bearing may be disposed in the space, advantages of which are noted above. For the rotatable wheels, an offset may be employed (see d in FIG. 1) of between about 1.35 and 1.50 inches.

Generally the shape of the dolly may be symmetric with respect to its long axis, and may be rectangular with front, rear, left and right mainframe members. In the center of the rectangular mainframe is a recessed bay area for placing the floor jack (FIG. 1). The top side of the base may be recessed lower than the frame formed by the side portions but above the surface level, i.e., floor level. The base recessed position may be generally accomplished by attaching the base to the mainframe (side portion) members. In many implementations, one objective of the recessed base is to position the floor jack and to lower the floor jack center of gravity while maintaining adequate clearance between the bottom side of the base and the floor level.

Figure 9A:
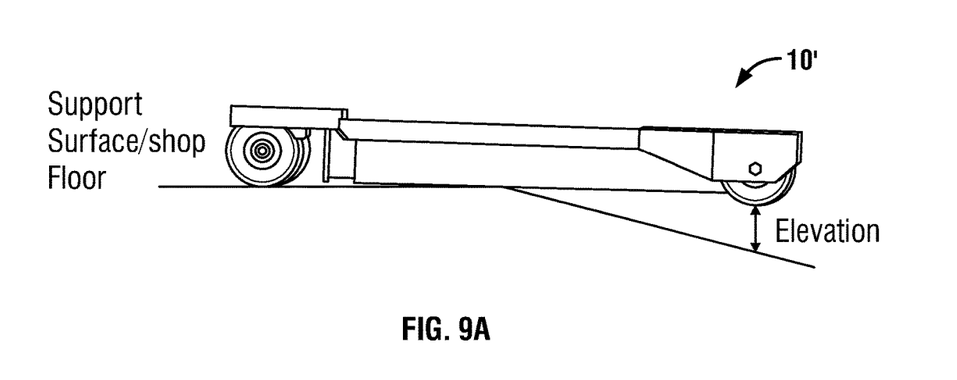
FIGS. 9A and 9B illustrate a potential benefit of a dolly employing a slant or angle.
Figure 9B:
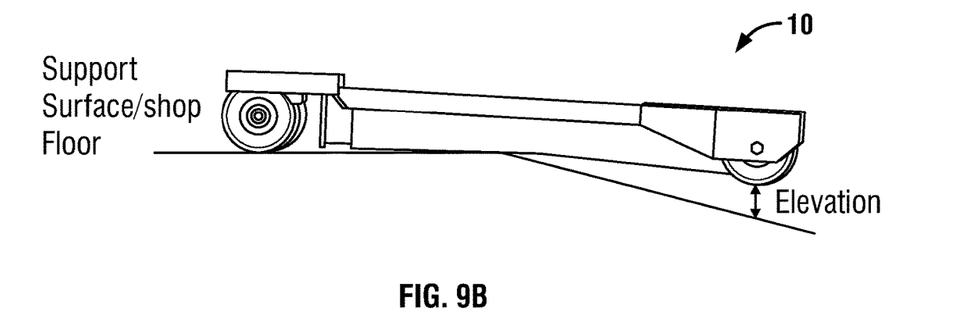

As noted above, and as illustrated in greater detail in FIGS. 9A and 9B, the dolly may in some implementations have an inverted V shape for the bottom side and/or side portions 12a and 12b. And it is noted that the angle may be implemented within the side portions, and in some cases also on the bottom side of the base. However, in many implementations, the base may be situated high enough above the support surface that the same is higher than the apex of the inverted V shape, negating the need for an angle to be defined in the base.

This shape is especially useful in certain implementations as the same significantly enhances the ability of the dolly to clear bumps, ramps and uneven ground surfaces. Referring to the noted figures, FIG. 9A illustrates a dolly 10' with a flat bottom and side portions and FIG. 9B illustrates a dolly 10 employing a slant or angle. An exemplary angle of 177° is illustrated, but it will be understood that such may vary depending on use and terrain. As may be seen, use of such an angled surface allows convenient negotiation of obstacles such as uneven pavement, as is commonly encountered when transferring the assembly from a parking lot to a shop floor. In particular, as may be seen by comparing FIGS. 9A and 9B, a significantly lessened elevation is required in the case where an angled bottom side is employed. Other benefits will also be understood.

Figure 10A:
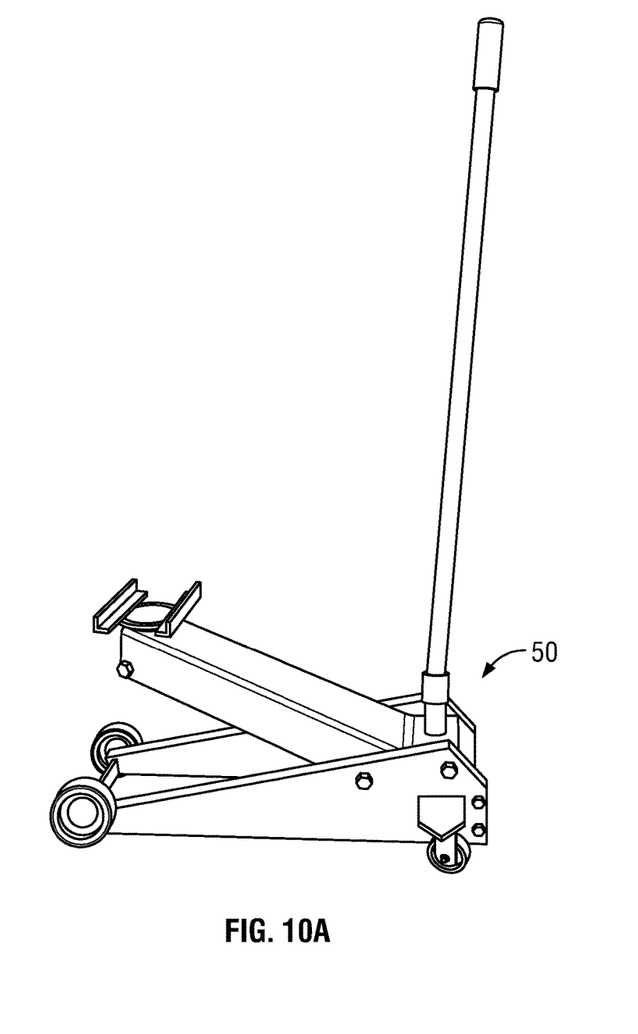
FIGS. 10A-10C illustrate a floor jack, a perspective view of a floor jack within a dolly according to present principles, and a top view of a floor jack within a dolly according to present principles, respectively.
Figure 10B:
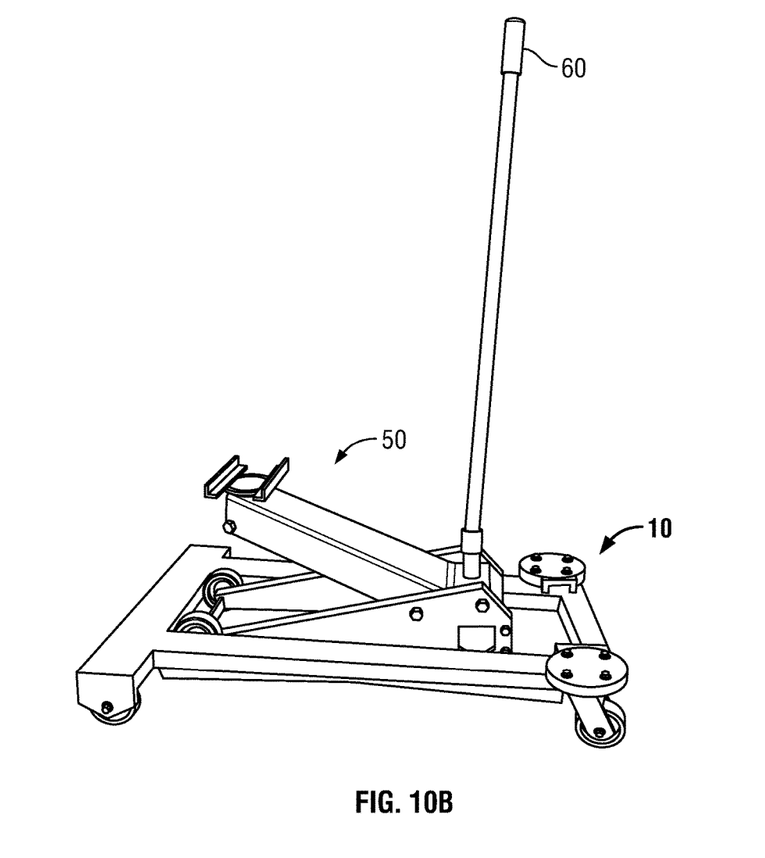
Figure 10C:
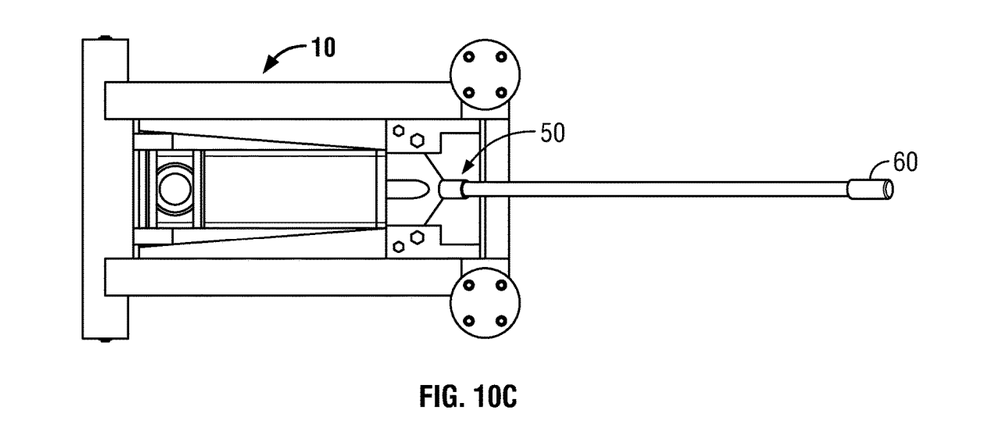

FIGS. 10(A)-10(C) illustrate an assembly in which a floor jack 50 is situated within the recess of dolly 10 formed by the base 20 and the side portions 12A, 12B, 14A, and 14B. A handle 60 of the floor jack is also shown, and in use, the handle 60 may be employed to maneuver the floor jack around a parking lot or shop floor.

As the term is used here, a "front" member of the mainframe contains the "front" wheels that are in some cases rotatable. These front wheels in some implementations may carry the majority of the vehicle weight that is being moved. The left and right mainframe members may be connected perpendicularly to the front frame member, and the same support the base and further provide support for the rear wheel assemblies, which as noted may in some cases be fixed. The rear mainframe member connects and maintains alignment between the rear wheel assemblies. One or more of the side pieces, e.g., the rear mainframe member 14a, can also be removed and re-installed for the purpose of rolling a floor jack onto and off of the dolly. The dolly's front and rear wheel assemblies may be serviceable and replaceable components.

Figure 11:
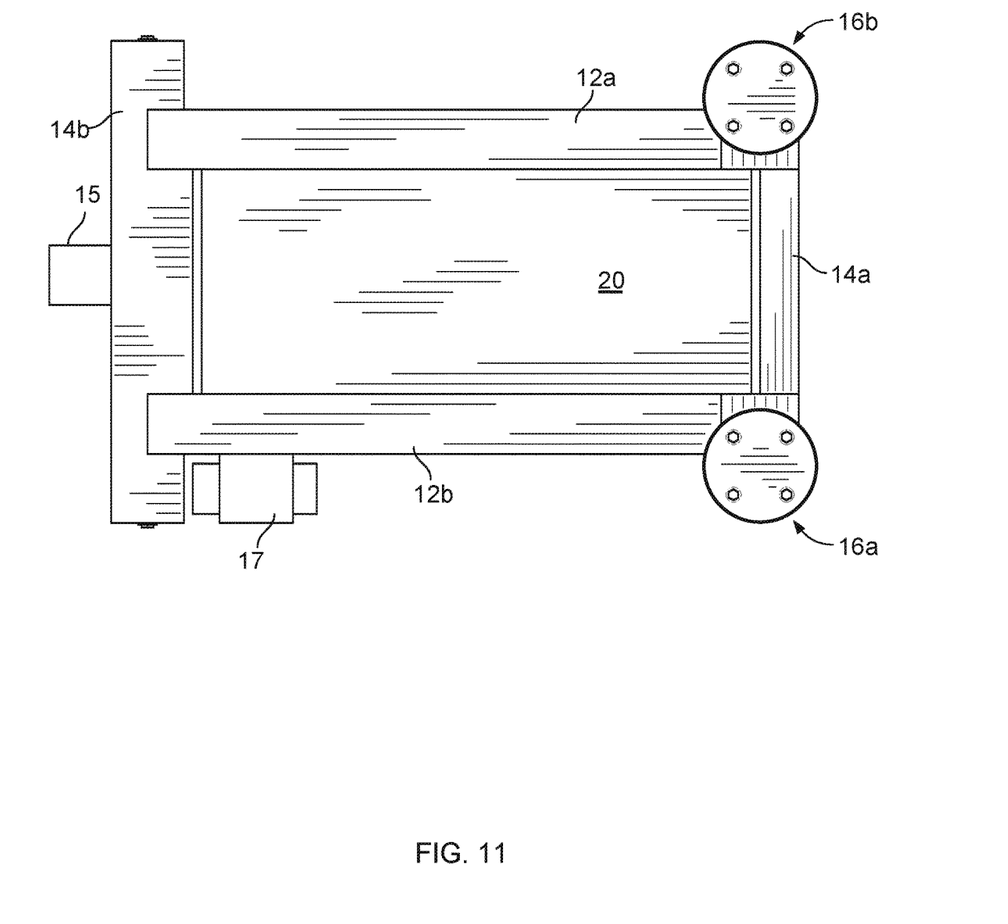
FIG. 11 is a schematic illustration of a powered dolly.

Referring to FIG. 11, in some cases a source of locomotion 15 may be provided to power, motorize, or otherwise render the dolly mobilizable on a lot, thereby to allow powered motion to more easily move vehicles. In some cases, the front mainframe member, e.g., side portion 14b, can provide or support the drive components of the motorized version. Wherever the drive components are situated, the same can drive one or more of the wheel assemblies. In some cases the drive components may drive a track system 17, such as in a tractor or tank, e.g., a rubber track coupled to a motor which allows mobilization over particularly difficult terrain. The same may be particularly employed in snow or ice environments, roads with a significant amount of sand, or other deleterious environments.

EXAMPLE

Systems and methods according to present principles have been tested in an actual automotive repair shop, and have proven to be invaluable in the movement of disabled vehicles. Not only are vehicles conveniently moved in a way not possible before, but also with a convenience and safety not possible before. The systems and methods according to present principles have garnered not just convenience in this automotive repair shop but also interest from potential purchasers.

It will be appreciated that elements or components shown with any embodiment herein are merely exemplary for the specific embodiment and may be used on or in combination with other embodiments disclosed herein.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

The invention claimed is:

1. A specialty dolly for automotive repair, comprising:
   a. a housing including a base having a top side and a bottom side, a portion of the top side defining a horizontal surface, the base substantially surrounded on its perimeter by a plurality of side portions, the side portions and the base defining a recessed portion configured for receiving a wheeled floor jack atop the top side; and
   b. at least three wheel assemblies, the wheel assemblies configured to support the housing such that the housing is elevated above a support surface for movement, and such that at least one wheel assembly is rotatable about an axis perpendicular to the horizontal surface;
   c. such that the bottom surface includes an angled section, whereby the housing and wheel assemblies are configured and arranged to maneuver over and/or around bumps, potholes, slopes or ramps;
   d. wherein the recessed portion is such that the top side of the base is below a topmost point of the wheel assemblies; and
   e. wherein the base is sized complementary to a footprint of the wheeled floor jack, and wherein the recessed portion is configured to receive the wheeled floor jack atop the top side, and wherein the plurality of side portions are positioned to be surrounding the wheeled floor jack when the wheeled floor jack is received in the recessed portion, such that the wheeled floor jack is prevented from rolling off of the base.

2. The dolly of claim 1, such that the plurality of side portions number four in total, and further comprising at least additional one wheel assembly, such that the housing is configured to be supported by a total of four wheel assemblies on the support surface, the four wheel assemblies disposed in a rectangular configuration, such that at least two wheel assemblies are adjacent and rotatable about the axis perpendicular to the horizontal surface, and such that at least two other wheel assemblies are adjacent and fixed relative to the axis perpendicular to the horizontal surface.

3. The dolly of claim 2, wherein the angled section runs between the two wheel assemblies that are fixed and the two wheel assemblies that are rotatable.

4. The dolly of claim 3, wherein the angled section forms an inverted V shape, and wherein a peak of the V shape is between the two wheel assemblies that are rotatable and the two wheel assemblies that are fixed.

5. The dolly of claim 4, wherein the angled section forms an angle of between about 172 and 179 degrees.

6. The dolly of claim 5, wherein the angled section forms an angle of between about 176 and 178 degrees.

7. The dolly of claim 6, wherein the angled section forms an angle of about 177 degrees.

8. The dolly of claim 2, wherein when on the support surface a majority of carried weight is supported by the set of rotatable wheel assemblies.

9. The dolly of claim 2, wherein when on the support surface a majority of carried weight is supported by the set of fixed wheel assemblies.

10. The dolly of claim 1, wherein when on the support surface a height of a topmost portion of the dolly is less than about 6 inches.

11. The dolly of claim 1, wherein each of the at least one wheel assembly that is rotatable includes an angular contact thrust ball bearing, such that each wheel assembly that is rotatable has significant strength along the axis and significant strength in a direction transverse to the axis.

12. The dolly of claim 11, wherein each of the at least one wheel assembly that is rotatable has an offset of between about 1.35 and 1.50 inches.

13. The dolly of claim 11, wherein each of the rotatable wheel assemblies includes a respective dual wheel assembly having two wheels, each of the two wheels of the dual wheel assembly being independently rotatable.

14. The dolly of claim 13, wherein each of the two wheels in each dual wheel assembly has a radius of between about 2 and 3 inches and a width of between about 1 and 2 inches.

15. The dolly of claim 14, wherein each of the two wheels in each dual wheel assembly is made from polyurethane.

16. The dolly of claim 14, wherein each of the two wheels in each dual wheel assembly is made from a material having a hardness of between about 90 and 100 durometer.

17. The dolly of claim 16, wherein each of the two wheels in each dual wheel assembly is made from a material having a hardness of about 95 durometer.

18. The dolly of claim 13, wherein each dual wheel assembly defines a space between the wheels, and wherein each respective angular contact thrust ball bearing is disposed within the space.

19. The dolly of claim 1, wherein when on the support surface the dolly is configured to be moved and maneuvered using a handle of a floor jack.

20. The dolly of claim 1, wherein the housing further comprises a source of locomotion by which the dolly is configured to be powered for movement.

21. The dolly of claim 20, wherein the source of locomotion includes a drive system for one or more of the wheel assemblies.

22. The dolly of claim 1, further comprising a means for lifting coupled to the top side.

23. The dolly of claim 1, wherein at least one of the side portions is removable, such that upon removal the floor jack is configured to be rolled onto and off of the top side.

* * * * *